United States Patent
Kim et al.

(10) Patent No.: US 10,129,385 B2
(45) Date of Patent: *Nov. 13, 2018

(54) METHOD AND APPARATUS FOR GENERATING AND PLAYING ANIMATED MESSAGE

(71) Applicant: Samsung Electronics Co., Ltd., Gyeonggi-do (KR)

(72) Inventors: Do-Hyeon Kim, Gyeonggi-do (KR); Mu-Sik Kwon, Seoul (KR); Woo-Sung Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,319

(22) Filed: Jun. 20, 2016

(65) Prior Publication Data

US 2016/0323436 A1   Nov. 3, 2016

Related U.S. Application Data

(63) Continuation of application No. 13/641,299, filed as application No. PCT/KR2011/002656 on Apr. 14, 2011, now Pat. No. 9,374,449.

(30) Foreign Application Priority Data

Apr. 15, 2010 (KR) .......................... 10-2010-0034814

(51) Int. Cl.
  *G06T 13/80* (2011.01)
  *H04M 1/725* (2006.01)
  (Continued)

(52) U.S. Cl.
  CPC .... *H04M 1/72555* (2013.01); *G06F 3/04883* (2013.01); *G06T 3/0006* (2013.01);
  (Continued)

(58) Field of Classification Search
  USPC ................................................. 345/473, 474
  See application file for complete search history.

(56) References Cited

U.S. PATENT DOCUMENTS

5,903,667 A    5/1999   Kuzunuki et al.
6,021,433 A    2/2000   Payne et al.
(Continued)

FOREIGN PATENT DOCUMENTS

KR   1020030057990   7/2003
KR   1020060087746   8/2006
(Continued)

OTHER PUBLICATIONS

Korean Office Action dated Jun. 22, 2016 issued in counterpart application No. 10-2010-0034814, 8 pages.

(Continued)

*Primary Examiner* — Kimbinh T Nguyen
(74) *Attorney, Agent, or Firm* — The Farrell Law Firm, P.C.

(57) ABSTRACT

A method and an electronic device are provided for transmitting a message from an electronic device to another electronic device. Handwritten input comprising one or more input objects is received. Playback information of the one or more input objects is generated using input coordinates of the one or more input objects or input times of the one or more input objects. An animation message including a first region in which one or more images are displayed, and a second region in which the one or more input objects are displayed, is generated according to the playback information. The animation message is transmitted to the another electronic device.

18 Claims, 6 Drawing Sheets

(51) Int. Cl.
  *G06F 3/0488* (2013.01)
  *G06T 3/00* (2006.01)
  *G06T 9/00* (2006.01)
  *H04W 4/14* (2009.01)
  *G06T 7/13* (2017.01)
  *G06T 7/194* (2017.01)

(52) U.S. Cl.
  CPC ............... *G06T 7/13* (2017.01); *G06T 7/194* (2017.01); *G06T 9/00* (2013.01); *G06T 13/80* (2013.01); *H04W 4/14* (2013.01); *G06T 2207/20164* (2013.01)

(56) References Cited

U.S. PATENT DOCUMENTS

| | | | |
|---|---|---|---|
| 6,278,466 B1* | 8/2001 | Chen | G06T 13/00 345/473 |
| 7,215,815 B2 | 5/2007 | Honda | |
| 7,367,885 B2 | 5/2008 | Escalera et al. | |
| 7,953,426 B2 | 5/2011 | Kim | |
| 8,004,529 B2 | 8/2011 | Wood et al. | |
| 8,204,547 B2 | 6/2012 | Jang | |
| 2001/0050685 A1* | 12/2001 | Simons | G06T 13/00 345/475 |
| 2003/0035412 A1 | 2/2003 | Wang et al. | |
| 2003/0051255 A1* | 3/2003 | Bulman | G06Q 30/00 725/135 |
| 2005/0143136 A1* | 6/2005 | Lev | H04L 29/06 455/566 |
| 2007/0225021 A1 | 9/2007 | Im et al. | |
| 2008/0098430 A1 | 4/2008 | Kim | |
| 2008/0165210 A1* | 7/2008 | Platzer | G06F 3/0485 345/672 |
| 2008/0216022 A1 | 9/2008 | Lorch et al. | |
| 2009/0199110 A1 | 8/2009 | Kim et al. | |
| 2010/0020970 A1 | 1/2010 | Liu et al. | |
| 2010/0067674 A1 | 3/2010 | Lee | |
| 2010/0179991 A1 | 7/2010 | Lorch et al. | |
| 2011/0037767 A1 | 2/2011 | Casanova et al. | |

FOREIGN PATENT DOCUMENTS

| | | |
|---|---|---|
| KR | 1020070049702 | 5/2007 |
| KR | 1020070066661 | 6/2007 |
| KR | 1020070088090 | 8/2007 |
| KR | 1020070099504 | 10/2007 |
| KR | 1020080039606 | 5/2008 |
| KR | 1020090085954 | 8/2009 |
| KR | 1020090110431 | 10/2009 |
| WO | WO 00/63771 | 10/2000 |

OTHER PUBLICATIONS

PCT/ISA/237 Written Opinion issued on PCT/KR2011/002656 (pp. 4).

PCT/ISA/210 Search Report issued on PCT/KR2011/002656 (pp. 3).

Korean Office Action dated Mar. 23, 2016 issued in counterpart application No. 10-2010-0034814, 13 pages.

European Search Report dated Sep. 27, 2017 issued in counterpart application No. 11769090.9-1870, 4 pages.

* cited by examiner

| PLAYBACK ORDER | OBJECT NUMBER (ORDER) | ANIMATION EFFECT | TIMELINE | REPETITION INDICATOR | DURATION INDICATOR | DURATION |
|---|---|---|---|---|---|---|
| #1 | 21 | CONTINUOUSLY DISPLAYED | 1 | 0 | OBJECT | -1 |
| #2 | 22 | DISAPPEAR AFTER DISPLAYED | 1 | 0 | OBJECT | 3 |
| #3 | 23 | REPEATEDLY DISPLAYED | 1 | 1 | OBJECT | 1 |
| #4 | 24 | REPEATEDLY DISPLAYED | 1 | 1 | OBJECT | 1 |
| #5 | 25 | DISAPPEAR AFTER DISPLAYED | 1 | 0 | OBJECT | 1 |
| #6 | 26 | CONTINUOUSLY DISPLAYED | 1 | 0 | OBJECT | -1 |

[Fig. 5]

| FRAME NUMBER | #1 | #2 | #3 | #4 | #5 | #6 |
|---|---|---|---|---|---|---|
| LIST OF OBJECTS TO BE DRAWN | 21 | 22 | 23 | 24 | 25 | 26 |
|  |  |  |  |  | 23 | 24 |
| LIST OF OBJECTS TO BE ERASED |  |  |  | 23 | 24 | 23 |
|  |  |  |  |  | 22 | 25 |

| OBJECT NUMBER | NUMBER OF FRAMES | ANIMATION EFFECT | TIMELINE | REPETITION INDICATOR | DURATION INDICATOR | DURATION |
|---|---|---|---|---|---|---|
| 1 | 2 | CONTINUOUSLY DISPLAYED | 1 | 0 | - | -1 |
| 2 | 4 | DISAPPEAR AFTER DISPLAYED | 1 | 0 | FRAME | 3 |
| 3 | 2 | REPEATEDLY DISPLAYED | 1 | 1 | FRAME | 2 |
| 4 | 3 | REPEATEDLY DISPLAYED | 1 | 1 | OBJECT | 1 |
| 5 | 3 | DISAPPEAR AFTER DISPLAYED | 1 | 0 | OBJECT | 1 |
| 6 | 2 | CONTINUOUSLY DISPLAYED | 1 | 0 | - | -1 |

[Fig. 8]

|  | SCREEN DISPLAY | DRAWN | ERASED |
|---|---|---|---|
| #1 | 1 2 3 4 5 6 | | |
| #2 | 1 2 3 4 5 6 | | |
| #3 | 1 2 3 4 5 6 | 2 | |
| #4 | 1 2 3 4 5 6 | | |
| #5 | 1 2 3 4 5 6 | | |
| #6 | 1 2 3 4 5 6 | | |
| #7 | 1 2 3 4 5 6 | 3 | 2 |
| #8 | 1 2 3 4 5 6 | | |
| #9 | 1 2 3 4 5 6 | 4 | 3 |
| #10 | 1 2 3 4 5 6 | | |
| #11 | 1 2 3 4 5 6 | 3 | |
| #12 | 1 2 3 4 5 6 | 5 | 4 |
| #13 | 1 2 3 4 5 6 | | 3 |
| #14 | 1 2 3 4 5 6 | | |
| #15 | 1 2 3 4 5 6 | 3 4 6 | 5 |
| #16 | 1 2 3 4 5 6 | | |

[Fig. 9]

START
↓
RECEIVE HANDWRITTEN INFORMATION — 910
↓
GENERATE HANDWRITTEN INPUT INFORMATION — 920
↓
SET PLAYBACK INFORMATION OF EACH OBJECT OF HANDWRITTEN INPUT INFORMATION — 930
↓
GENERATE HANDWRITING REGION USING INPUT IMAGE — 940
↓
GENERATE DISPLAY INFORMATION OF ENCODING REGION BY ENCODING INPUT INFORMATION — 950
↓
GENERATE ANIMATION MESSAGE INCLUDING HANDWRITING REGION AND ENCODING REGION — 960
↓
TRANSMIT ANIMATION MESSAGE — 970
↓
END

METHOD AND APPARATUS FOR GENERATING AND PLAYING ANIMATED MESSAGE

PRIORITY

This application is a Continuation Application of U.S. application Ser. No. 13/641,299, filed in the U.S. Patent and Trademark Office on Oct. 15, 2012, which is a National Phase Entry of PCT International Application No. PCT/KR2011/002656, which was filed on Apr. 14, 2011, which claims priority to Korean patent Application Serial No. 10-2010-0034814, which was filed in the Korean Intellectual Property Office on Apr. 15, 2010, the contents of which are incorporated herein by reference.

BACKGROUND OF THE INVENTION

1. Field of the Invention

The present invention relates generally to a message service for a mobile communication terminal, and more particularly, to a method and apparatus for generating and playing an animated message, in which handwritten information entered by a user on a touch screen or an image captured by a camera may be animated.

2. Description of the Related Art

The capabilities of mobile terminals have been significantly enhanced by developments in technologies such as wired/wireless communication technology, multimedia technology, power charging technology, and in manufacturing technology for hardware, such as Central Processing Units (CPUs) and memories. For example, while the early mobile terminals send information to another terminal using voice calls, improved mobile terminals, which are capable of exchanging text messages, may send simple information using Short Message Service (SMS) messages, which include simple text information, when voice calls are unavailable or undesirable.

SMS has evolved into Long Message Service (LMS), which is capable of including long-text information, and Multimedia Message Service (MMS), which is capable of including multimedia files, such as images and videos. Unlike SMS and LMS, which only send text information, user demand for MMS has dramatically increased because of its scalability of expression.

The current MMS only sends stored images. Therefore, when a user wants to send handwritten information using MMS, a sender (or a sending terminal) must convert the handwritten information into an image file using a separate application, store the image file, and then send the stored image file. The handwritten information is converted into a single still image, showing only the handwritten results without reflecting the input sequence of the information for the handwriting.

Therefore, when MMS having the image file with the handwritten information is received at a recipient, the image is viewed as a single still image. The reception of a still image makes it impossible to sequentially express the order in which the sender created the handwritten information, and causes difficulty in delivering handwriting action information or emotional state information of the sender.

SUMMARY OF THE INVENTION

The present invention has been made to address at least the above problems and/or disadvantages and to provide at least the advantages described below. Accordingly, an aspect of the present invention provides a method and apparatus for generating and playing an animated message, in which handwritten input information entered by a user on a touch screen is generated as a message, and the generated message may be played in an animated manner according to the input order of objects or the order arbitrarily set by the user.

Another aspect of the present invention provides a method and apparatus for generating an animated message by extracting objects from an image captured by a camera, and playing the animated message in an animated manner.

A further aspect of the present invention provides a method and apparatus for generating an animated message by creating and storing handwritten input information entered by a user on a frame basis, and playing the animated message in an animated manner.

In accordance with one aspect of the present invention, a method is provided for transmitting a message from an electronic device to another electronic device. Handwritten input comprising one or more input objects is received. Playback information of the one or more input objects is generated using input coordinates of the one or more input objects or input times of the one or more input objects. An animation message including a first region in which one or more images are displayed, and a second region in which the one or more input objects are displayed, is generated according to the playback information. The animation message is transmitted to the another electronic device.

In accordance with another aspect of the present invention, an electronic device is provided for transmitting a message to another electronic device. The electronic device includes a controller configured to, if a handwritten input comprising one or more input objects is received, generate playback information of the one or more input objects using input coordinates of the one or more input objects or input times of the one or more input objects. The controller is also configured to generate an animation message including a first region in which one or more images are displayed, and a second region in which the one or more input objects are displayed according to the playback information. The electronic device also includes a communication interface configured to transmit the animation message to the another electronic device.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by similar reference numerals although they are illustrated in different drawings. Detailed descriptions of constructions or processes known in the art may be omitted to avoid obscuring the subject matter of the present invention.

The present invention provides a method and apparatus for generating and playing an animated message, in which handwritten information entered by a user on a touch screen is generated as a message, and the generated message may be played in an animated manner according to the input order of objects or an order arbitrarily set by the user.

In addition, the present invention provides a method and apparatus for generating and playing an animated message, in which objects are extracted from an image captured by a camera and playback information, including the playback order of the extracted objects, is set to play the animated message in an animated manner.

Furthermore, the present invention provides a method and apparatus for generating an animated message by creating and storing handwritten input information entered by a user on a frame basis, and for playing the animated message in an animated manner.

The present invention also provides a method and apparatus for separately setting or defining an encoding region in an animated message and delivering handwritten input information using the encoding region.

Figure 1:
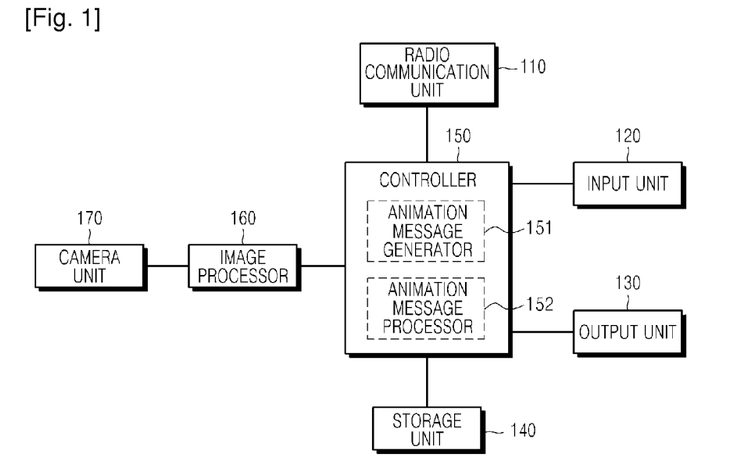
FIG. 1 is a block diagram illustrating an apparatus for generating and playing an animated message, according to an embodiment of the present invention.

FIG. 1 illustrates an apparatus for generating and playing an animated message, according to an embodiment of the present invention.

Referring to FIG. 1, the apparatus for generating and playing an animated message includes a radio communication unit 110, an input unit 120, an output unit 130, a storage unit 140, a controller 150, a camera unit 170, and an image processor 160.

The radio communication unit 110 performs communication over a mobile communication network. In an embodiment of the present invention, the radio communication unit 110 transmits and receives animated messages, including individual playback information for objects.

The input unit 120 receives input from a user. The output unit 130 displays output information under the control of the controller 150. In an embodiment of the present invention, the input unit 120 and the output unit 130 may be realized as a single touch screen. The input unit 120 receives handwritten inputs entered by the user and transfers the received handwritten inputs to the controller 150. The output unit 130 plays animated messages under the control of the controller 150.

The storage unit 140 stores information for operations of the animated message generating and playing apparatus. In an embodiment of the present invention, the storage unit 140 stores images captured by the camera unit 170 and animated messages received from or to be sent to external devices.

The camera unit 170, which includes a lens and an image sensor, provides images captured by photographing subjects to the image processor 160.

The image processor 160 receives an image captured by the camera unit 170, and extracts point data from the received image to extract object information. The image processor 160 may extract object information from images stored in the storage unit 140.

In accordance with an embodiment of the present invention, the image processor 160 includes an automatic object region extracting unit, an object region correction unit, and a point data extracting and animation effect extracting unit.

In an embodiment of the present invention, the image processor 160 identifies color information of the central region of an image captured by the camera unit 170, extracts edge information of the central region, and separates and extracts the central interested region based on the color information and edge information of the central region of the image. The image processor 160 extracts contour information of an object in the rectangular central region to extract the object, by performing region growing on a region(s) having a color that is similar to that of the extracted interested region. The image processor 160 then detects corners by extracting boundaries of the extracted object, and performs affine transform on the extracted object. The image processor 160 extracts an object by binarizing an image and separating the object from the background, and creates an input time of the extracted object.

The region growing, which is a method used for region segmentation in image processing, grows regions having the same feature, little by little, to divide the regions. In the region growing, the similarity between the regions may be determined depending on, for example, brightness, colors, and/or gradients, of related pixels.

The affine transform is a linear geometric transform achieved by one or more of scaling, rotation and translation.

The controller 150 controls the components of the animated message generating and playing apparatus. In an embodiment of the present invention, the controller 150 includes an animated message generator 151 for generating animated messages using handwritten input information that is created using the input unit 120. The controller also includes and an animated message processor 152 for decoding animated messages received from the radio communication unit 110, and playing the decoded animated messages.

The animated message generator 151 receives handwritten input (or an event) entered from the input unit 120, and extracts input information, including information about an input time and input coordinates, from the received handwritten input. The animated message generator 151 distinguishes input objects according to their input information, and sets playback information, including information about the playback order of the input objects. The animated message generator 151 then encodes the input information and the set playback information of the input objects. The encoding is performed in a lossless compression or non-compression manner by creating one or more codes and encoding input information and individual playback information of objects. The created one or more codes are then used in a recipient (or a receiving terminal) to play an animated message according to the sequential input information. Additional information, including information about a terminal generating an animated message, a generation time, an application used, and an encoding method, may be created as one or more codes, and the created one or more codes may be included in the animated message. The encoded one or more codes are mapped and converted into an image according to the pixel values of one or more pixels in an encoding region of an animated message. This image is compressed in an image format, such as, for example, Joint Photographic coding Experts Group (JPEG).

The term 'input information', as used herein, refers to information about an input first entered by a user, and represents information about the first input time and input coordinates, and information including at least one of an input order of handwriting strokes, attributes of handwriting strokes, and input colors of handwriting strokes, among the input handwritten information.

The term 'object', as used herein, refers to distinguishable individual information such as a handwriting stroke, a shape, an image, and a character, among the information entered through the input unit 120.

The term 'playback information', as used herein, refers to information that can be arbitrarily set by a user, and includes at least one of an input order indicating the order in which an object is entered, a region location indicating location information of an object, a timeline number indicating a unique number of a reference time axis along which animation is played, a repetition indicator which is a flag indicating whether an object is to be repeatedly displayed, a duration indicator indicating a unit time, and a duration indicating a time for which an object is displayed on a screen.

In an embodiment of the present invention, the animated message generator 151 in the controller 150 displays an input handwritten image in a predetermined handwriting region of an animated message. The animated message generator 151 allocates an encoding region used for storing input information, playback information of objects, and/or information about frame images, to a predetermined portion of the animated message. The animated message generator 151 divides the encoding region into a plurality of blocks having a predetermined size. The animated message generator 151 generates display information of the encoding region by mapping the input information, the playback information of objects, and/or the information about frame images, to the blocks of the encoding region of the animated message. The animated message generator 151 generates the animated message including the handwriting region and the encoding region.

The encoding region is located under the handwriting region, and includes a signature region used to display a signature and having a predetermined size. The signature region includes information set by a user, information provided in advance, or advertisements of the communication service provider. Vertical and horizontal sizes of the signature region are each set to a multiple of 16, and a horizontal position and a vertical position, which are measured as coordinates from a top-left starting position of the signature region, are also set to a multiple of 16.

In generating display information of a predetermined encoding region by mapping input information and playback information to blocks of the encoding region of an animated message, the animated message generator 151 converts playback information of objects and input information of an image into one or more codes, and maps values of the one or more codes to the blocks of the encoding region. This conversion and mapping changes the levels of gray values of the blocks according to the bit values of the code values during display. The gray values may be expressed in 4 levels capable of displaying 2-bit values, or in 8 levels capable of displaying 3-bit values.

The animated message generator 151 encodes input information of the handwriting region and playback information of objects, and includes the encoded information in the encoding region. The input information and the playback information are converted into one or more code values in the controller 150, and the code values are expressed as gray values of blocks or pixels in the encoding region. To reduce the distortion in JPEG encoding and a communication network, the operation of encoding an encoding region divides a color of each block into K levels using gray values of colors of the blocks in the handwriting region. Independent bit values are allocated to the levels. Therefore, by allocating a value of one or more bits to each pixel or block in encoding, the amount of data may be ensured. For example, when gray values of 0~255 are divided into 4 levels of 0, 48, 96, and 144, the 4 levels may be allocated 2-bit values of 00, 01, 10, and 11, respectively. When the gray values are divided in 8 levels of 0, 32, 64, 96, 128, 160, 192, and 224, the 8 levels may be allocated 3-bit values of 000, 001, 010, 011, 100, 101, 110, and 111, respectively.

In an embodiment of the present invention, the animated message generator 151 extracts input information including information about an input time and input coordinates of each object in an image. The animated message generator 151 sets playback information including information about a playback order for each object, and displays the image in a predetermined handwriting region of an animated message. The animated message generator 151 generates display information of an encoding region by mapping the input information and the playback information to blocks in the encoding region used for storing the input information and the playback information, and generates the animated message including the handwriting region and the encoding region.

In an embodiment of the present invention, the animated message generator 151 generates an image by receiving handwritten input from a user through a touch screen, and extracts input information, including information about an input time and input coordinates, for each object in the generated image.

The animated message generator 151 converts the input information into one or more code values, and maps the one or more code values to blocks in the encoding region, to change levels of gray values of the blocks according to the bit values of the code values during display. The gray values may be expressed in 4 levels capable of displaying 2-bit values, or in 8 levels capable of displaying 3-bit values.

In another embodiment of the present invention, the animated message generator 151 receives an image to be played in each frame during playback of an animated message. The animated message generator 151 divides a predetermined encoding region of the animated message into a plurality of blocks having a predetermine size. The animated message generator 151 generates display information of the encoding region by mapping input information for the image received for each frame to the blocks in the encoding region, and generates the animated message including the encoding region.

The input information for the image received for each frame includes only a difference between the previous frame and the current frame of the image, and includes information generated and stored by simplifying information about objects in the image received for each frame.

Upon receiving an animated message through the radio communication unit 110, the animated message processor 152 decodes the received animated message to play the animated message. The animated message processor 152 performs an operation opposite to that of the animated message generator 151. The animated message processor 152 decompresses the compressed image in the received animated message, and reads pixel values from an encoding region in units of a predetermined number of pixels. The animated message processor 152 extracts code values of playback information and input information for each object in the animated message. The extracted code values are mapped to the pixel values. The animated message processor 152 restores playback information and the input information for each object by decoding codes of playback information of the next object. The animated message processor 152 controls the output unit 130 to play the animated message according to the restored playback information and input information for each object.

Upon receiving an animated message, the animated message processor 152 in the controller 150 extracts a handwritten image in a handwriting region of the received animated message, and extracts bit values mapped according to the gray values of blocks in an encoding region of the received animated message. The animated message processor 152 generates input information, including information about an input time and input coordinates of an input image in the animated message, and playback information, including information about a playback order for each object, according to the extracted bit values. The animated message processor 152 plays the animated message according to the input information and playback information in the animated message.

In accordance with another embodiment of the present invention, upon receiving an animated message, the animated message processor 152 extracts bit values mapped according to the gray values of blocks in an encoding region of the received animated message. The animated message processor 152 extracts information about an image received for each frame of the animated message according to the extracted bit values, and plays the image received for each frame using the extracted information.

A handwriting region of an animated message may be set as a 240×240 region, and a 240×80 region under the handwriting region may be used as an encoding region. The encoding region may be set above, around, or partially above and below the handwriting region. In order not to be affected by JPEG color distortion, the encoding region is set to have a size that is a multiple of 16×16 and equal to a macro block, and is set to have a starting position that is a multiple of 16×16.

Figure 2:
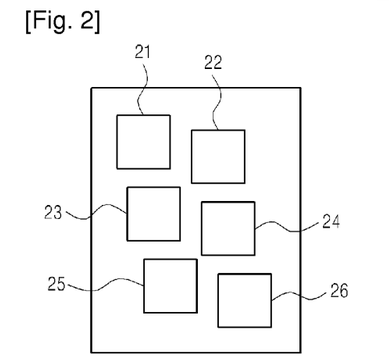
FIG. 2 is a diagram illustrating input objects in an animated message, according to an embodiment of the present invention.

A method for setting individual playback information of objects in generating an animated message according to an embodiment of the present invention is described in detail below. FIG. 2 is a diagram illustrating input objects in an animated message, according to an embodiment of the present invention. As illustrated in FIG. 2, it is assumed that six objects 21, 22, 23, 24, 25, and 26 were sequentially entered through handwriting input of a user.

The 'object', as used herein, refers to unit identities distinguishable in or extractable from an image, such as free handwriting (i.e., a stroke), a shape (i.e., a rectangle or a circle), an image (i.e., a stamp or a picture), text (i.e., a character, etc.), which are input by the user, or extracted from the image.

Regarding the objects 21, 22, 23, 24, 25, and 26, input information, such as an input time, point coordinates, and a color, may be stored for each object, and playback information for playing an animation using an animated message may be individually set for each object.

The animated message may be played using a sequential playback method in which objects are played in their input order, a random playback method in which objects are played according to a random playback order regardless of the input order, and a directional playback method in which objects are sequentially played after being rearranged, by referring to their region locations.

Figure 3:
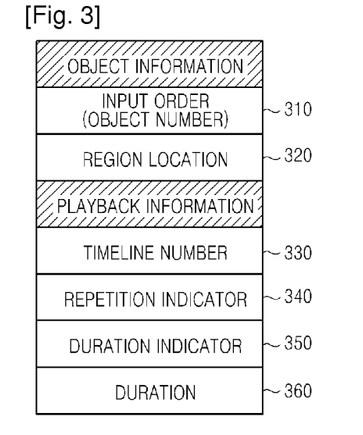
FIG. 3 is a diagram illustrating playback information of each object in an animated message, according to an embodiment of the present invention.

FIG. 3 is a diagram illustrating playback information of each object in an animated message, according to an embodiment of the present invention.

As illustrated in FIG. 3, playback information of each input object is configured to include an input order 310, indicating the order in which an object is entered, a region location 320, indicating location information of an object, a timeline number 330, indicating a unique number of a reference time axis along which animation is played, a repetition indicator 340, which is a flag indicating whether an object is to be repeatedly displayed, a duration indicator 350, indicating a unit time (e.g., a frame or an object), and a duration 360, indicating a time during which an object is displayed on a screen.

Playback information values associated with animation effects are provided below in Table 1.

TABLE 1

| Animation Effect | Repetition Indicator | Duration | Description |
| --- | --- | --- | --- |
| Continuously Displayed | 0 | −1 | Displayed in an N-th frame (not erased) |
| Disappear after Displayed | 0 | 10 | Displayed in an N-th frame (erased after a lapse of 10 frames, i.e., in an (N + 10)-th frame) |
| Repeatedly Displayed | 1 | 2 | Displayed in an N-th frame (erased after a lapse of 2 frames, i.e., in an (N + 2)-th frame, and displayed again after a lapse of 2 frames, i.e., in an (N + 4)-th frame on a repeated basis. |

Figure 4:
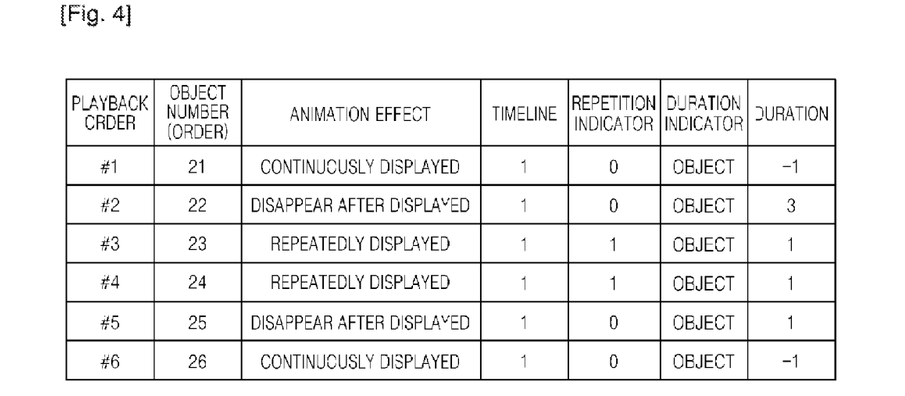
FIG. 4 is a diagram illustrating a playlist of objects in an animated message, according to an embodiment of the present invention.

FIG. 4 is a diagram illustrating an example of a playlist of objects in an animated message, according to an embodiment of the present invention. The playlist of the objects shown in FIG. 2 is used as an example for this embodiment.

Referring to FIG. 4, the objects 21 and 26 both have a repetition indicator of 0 and a duration of −1, meaning that, as illustrated in Table 1, they are displayed in associated frames #1 and #6, and then continuously displayed without being erased or closed. The object 22 is displayed once over 3 frames starting at a frame #2, because its duration is 3 and its repetition indicator is 0. The objects 23 and 24 are repeatedly displayed during one frame after being displayed in associated frames #3 and #4 because their duration is 1 and their repetition indicator is 1. The object 25 disappears after being displayed in a frame #5 during one frame, because its duration is 1 and its repetition indicator is 0.

Figure 5:
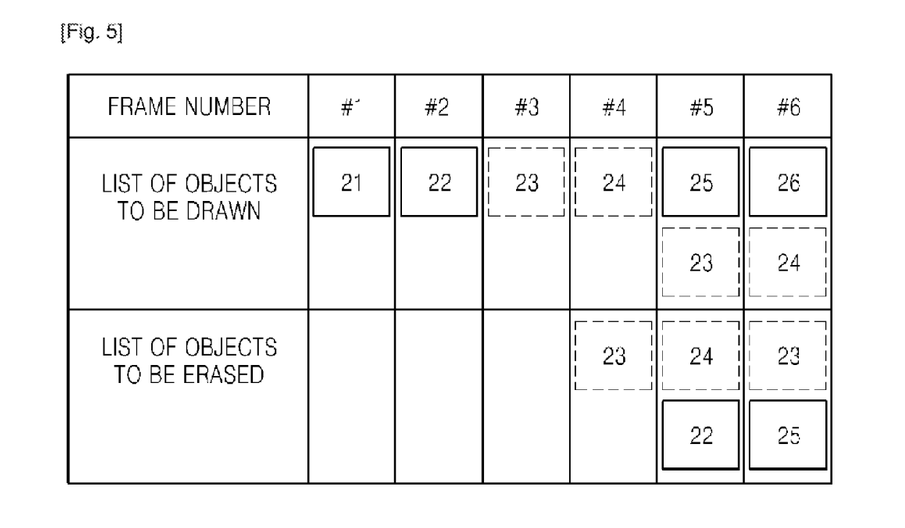
FIG. 5 is a diagram illustrating a list of objects to be drawn and a list of objects to be erased for the frames in the playlist of FIG. 4, according to an embodiment of the present invention.

FIG. 5 illustrates a list of objects to be drawn and a list of objects to be erased for the frames in the playlist of FIG. 4, according to an embodiment of the present invention.

As illustrated in FIG. 5, the list of objects to be drawn includes unique numbers in playback frames, and the list of objects to be erased includes unique numbers in playback frames.

The animated message processor 152 generates an object playlist using playback information of objects, which it has extracted from an animated message. The animated message processor 152 generates a list of objects to be drawn and a list of objects to be erased, as shown in FIG. 5, according to the object playlist (playback information), and plays the animated message using the list of objects to be drawn and the list of objects to be erased.

Figure 6:
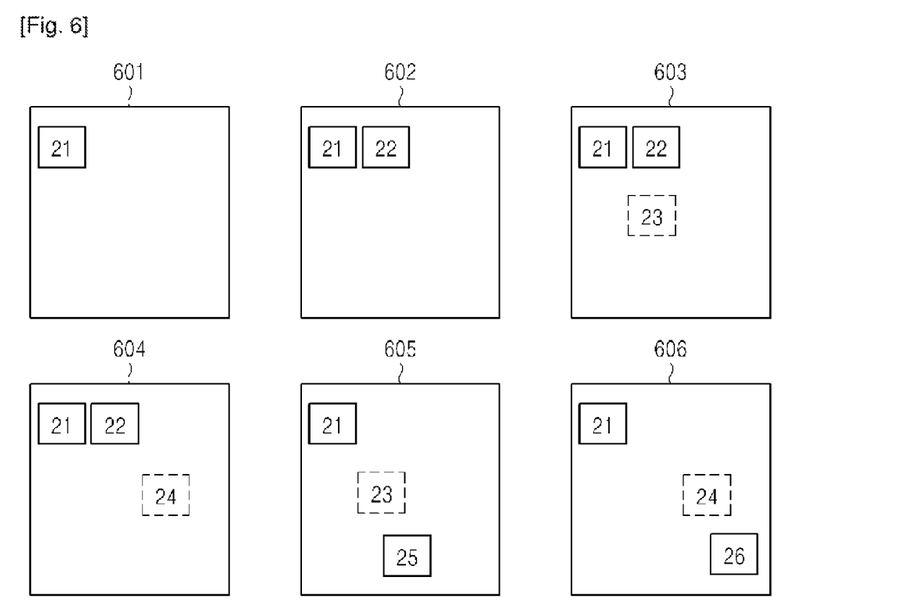
FIG. 6 is a diagram illustrating the playing of an animated message based on the playlist of FIG. 4, according to an embodiment of the present invention.

FIG. 6 illustrates the playing of an animated message based on the playlist of FIG. 4, according to an embodiment of the present invention.

Referring to FIG. 6, the animated message processor 152 plays animation by drawing or erasing objects in playback frames based on the list of objects to be drawn and the list of objects to be erased. Specifically, the object 21 is drawn in a first frame 601, the object 22 is drawn in a second frame 602, and the object 23 is drawn in a third frame 603. Thereafter, in a fourth frame 604, the object 23 is erased and the object 24 is drawn. In a fifth frame 605, the object 24 is erased and the objects 23 and 25 are drawn. In a sixth frame 606, the objects 23 and 25 are erased and the objects 24 and 26 are drawn. This animation is played according to the playback information set in the objects.

When the objects are free handwriting (strokes), during playback of a stroke, the entire stroke is not drawn in one frame at once, but the stroke may be divided into a set of points, and then drawn over several frames.

When an object needs to be played over several frames, whether the duration corresponds to a 'frame' or to an 'object', the duration may be set depending on the duration indicator 350 in the playback information.

For example, if the duration indicator 350 represents an 'object', the duration corresponds to the number of frames over which one object is fully displayed. If the duration indicator 350 represents a 'frame', the duration corresponds to one frame in which the object is displayed.

Figure 7:
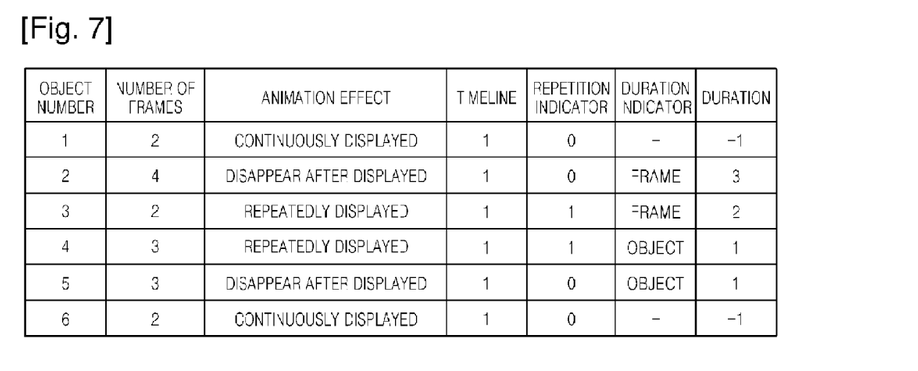
FIG. 7 is a diagram illustrating another playlist of objects in an animated message, according to an embodiment of the present invention.
Figure 8:
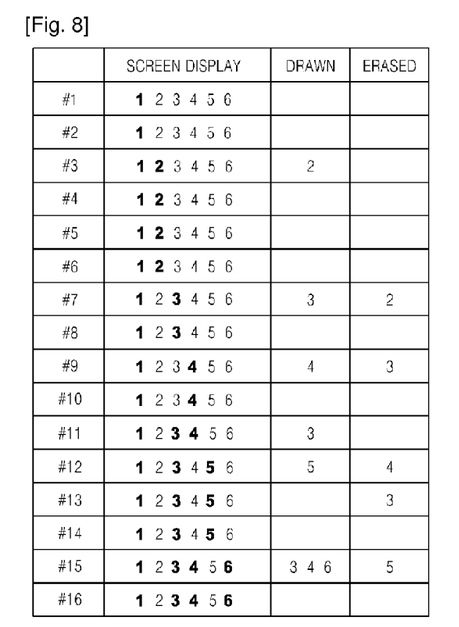
FIG. 8 is a diagram illustrating a method for displaying a screen on a playback frame basis in playing an animated message associated with the playlist of FIG. 7, according to an embodiment of the present invention.

FIG. 7 illustrates another playlist of objects in an animated message, according to an embodiment of the present invention. FIG. 8 illustrates a method for displaying a screen on a playback frame basis in playing an animated message associated with the playlist of FIG. 7, according to an embodiment of the present invention.

The playlist shown in FIG. 7 is for when two or more frames are required for playback of each object. Referring to FIG. 7, an object #1 requires two frames, for its playback, and is continuously displayed. An object #2 requires four frames for its playback, and is erased 3 frames after it was first displayed. An object #3 requires two frames for its playback, and is repeatedly displayed, lasting over two frames. An object #4 requires three frames for its playback, and is repeatedly displayed on an object basis. In this case, the object #4 is repeatedly displayed in each of the three frames because the number of frames for the object #4 is 3. An object #5 requires three frames for its playback, and is erased after it is displayed on a one-object basis. An object #6 requires two frames for its playback, and is continuously displayed.

The objects displayed on a screen on a frame basis, the list of objects to be drawn, and the list of objects to be erased, are created, as illustrated in FIG. 8.

Figure 9:
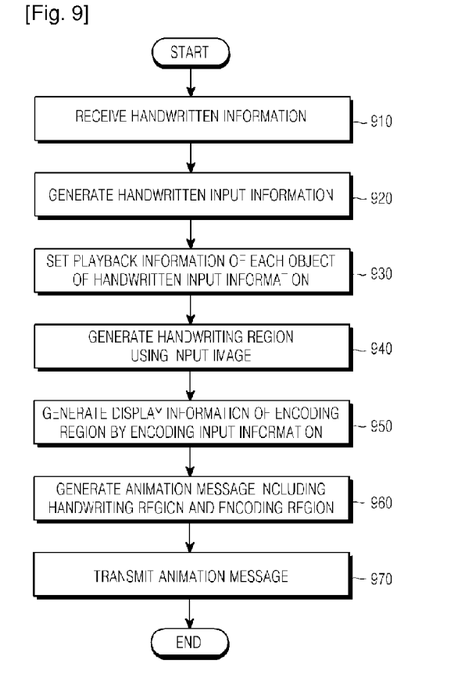
FIG. 9 is a flowchart illustrating a method for generating an animated message, according to an embodiment of the present invention.

FIG. 9 illustrates a method for generating an animated message, according to an embodiment of the present invention.

Referring to FIG. 9, in step 910, an animated message generating apparatus receives handwritten information from a user through an input unit 120. In step 920, an animated message generator 151 generates handwritten input information (e.g., information about point coordinates, an input order, a stroke, or a color) for each object in the received handwritten information. In step 930, the animated message generator 151 sets playback information for each object having the handwritten input information. In step 940, the animated message generator 151 generates a handwriting region using an input image. In step 950, the animated message generator 151 generates information consisting of one or more codes by encoding the input information and playback information of each object, allocates the generated code information to bits predetermined in an encoding region of an animated message, and displays related blocks in the encoding region using a gray value corresponding to the bits.

In step 960, the animated message generator 151 generates an animated message including the handwriting region and the encoding region. In step 970, the animated message generator 151 transmits the generated animated message by means of the radio communication unit 110.

An animated message receiving operations at a recipient (or a receiving terminal) are opposite the operations at a sender (or a sending terminal). That is, an animated message is received through the radio communication unit 110. An animated message processor 152 in a controller 150 extracts an image in an handwriting region, extracts a bit value of each block predetermined in an encoding region, extracts a gray value corresponding to the bit value of each block, and extracts a code value of handwritten input information using the gray value. The animated message processor 152 generates playback information and input information of each object used for driving an animated message, using the extracted code values, and playing the animated message using the generated playback information and input information. If it cannot play the animated message, the animated message processor 152 displays only the image in the handwriting region on an output unit 130.

Although a method of generating an animated message using handwritten input information entered by a user on a touch screen in accordance with an embodiment of the present invention has been described so far, a method of generating an animated message by extracting information about an object(s) from an image captured using a camera unit in accordance with another embodiment of the present invention is also possible as described in detail below.

Figure 10:
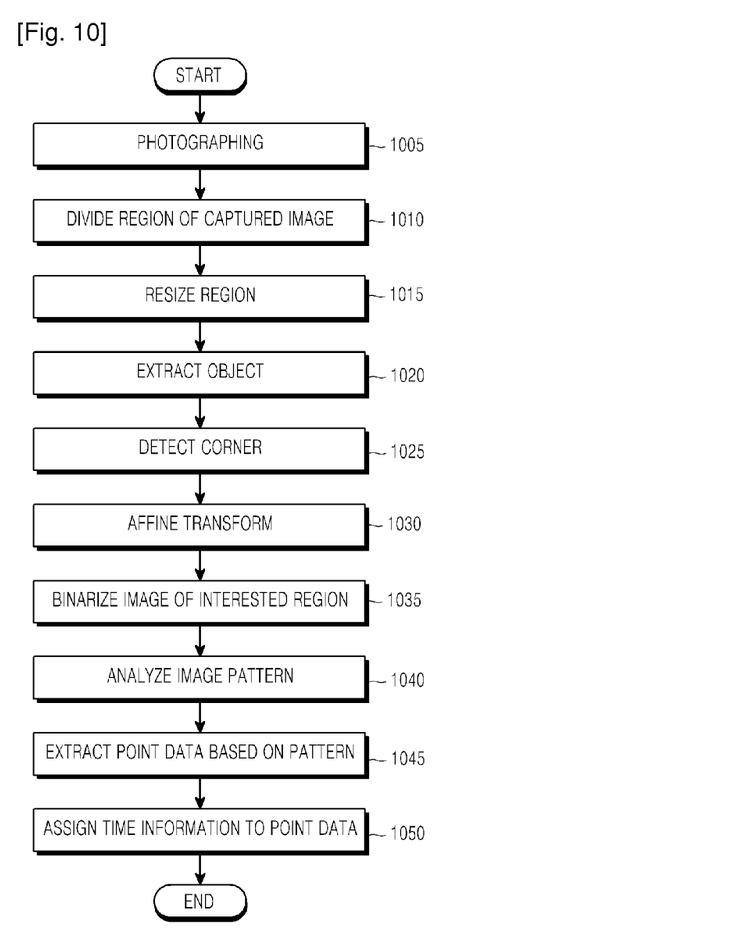
FIG. 10 is a flowchart illustrating a method for extracting object information from a captured image, according to an embodiment of the present invention.

FIG. 10 illustrates a method for extracting object information from a captured image, according to an embodiment of the present invention.

Referring to FIG. 10, in step 1005, an image captured by photographing an arbitrary subject using a camera unit 170 is transferred to an image processor 160. In step 1010, an automatic object region extracting unit in the image processor 160 identifies color information of the central region of the received image, and extracts edge information from a region associated with the color information of the central region to make an edge map. Based on the color information and edge information of the central region of the image, the automatic object region extracting unit separates and extracts an optimal central region. Since a user generally takes a picture of a subject, focusing on the center of an image, the automatic object region extracting unit selects a specific region of the central portion of the image, and extracts the representative color thereof. Preferably, the extracted region is set to have a rectangular structure.

In step 1015, the automatic object region extracting unit performs region growing on one or more regions having a color that is similar to that of the extracted region. In step 1020, the automatic object region extracting unit extracts an object by extracting contour information of an object in the temporary central region. Information about the extracted object is transferred to an object region correction unit.

In step 1025, the object region correction unit extracts the optimal contour information by detecting corners of an input rectangular object. Specifically, to extract contour information, the object region correction unit extracts an interested region in a reduced region after reducing an image. The interested region is defined as the largest component in a rectangular structure. For this region, an object is extracted by image smearing extraction and labeling techniques. To extract corners from the extracted object, a search range is adjusted for only the outermost pixels detectable by a boundary extraction technique. The extracted outermost pixels and corner points located farthest from the center of the region are extracted.

In step 1030, the object region correction unit performs affine transform to correct perspective distortion in which a captured image may be tilted.

A point data extracting and animation effect extracting unit separates the object from the background by binarizing an image in the corrected interested region, in step 1035. The point data extracting and animation effect extracting unit analyzes a pattern of point data in step 1040, and extracts point data associated with the pattern in step 1045. The pattern analysis is performed based on the number of objects consisting of point data. For character data, based on the distribution of objects, the character data is divided on a line or word basis, and point data is extracted starting from the top left.

In step 1050, the point data extracting and animation effect extracting unit assigns time information to the object associated with the point data. For example, when character data is extracted, time information may be set to extract components corresponding to the handwriting order and display them on the screen.

If the number of point data objects is large, time information of the point data is provided to display various animation effects, such as, for example, a circular pattern and a random pattern, and a screen is displayed, giving the animation effects. In addition, when an animated message is generated by extracting point data of an image captured by a camera unit, an animated message may be generated by setting an object using the extracted point data and setting playback information of the object. This operation may be set to be automatically performed.

In another embodiment of the present invention, an animated message is generated by creating multiple images such that one image may be played with one frame, and including this image information in an encoding region.

In another embodiment of the present invention, in one JPEG image constituting an animated message, handwritten information (e.g., point coordinates, strokes, an input order, and/or colors) input by a user is stored in an encoding region on a frame basis.

Since objects such as point data are simplified and stored in each frame, vector operations may be used. Dynamic animation effects may be achieved by analyzing information in an encoding region on a frame basis, and sequentially displaying the frames during decoding.

If a receiving device is a device incapable of decoding, the device displays the last-frame image entered in a sending terminal.

Figure 11:
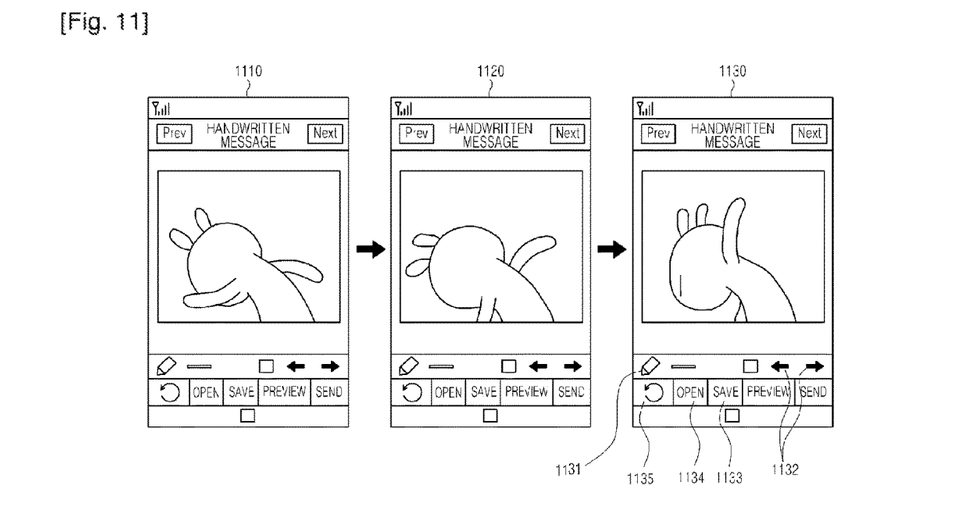
FIG. 11 is a diagram illustrating an operation of generating input images on a frame basis, according to an embodiment of the present invention.

FIG. 11 illustrates an operation of generating input images on a frame basis, according to an embodiment of the present invention.

Referring to FIG. 11, a user inputs images in a 240×240 handwriting region, frame by frame. To input images of frames displayed on screens 1110, 1120, and 1130, the user may generate the images of the frames using various 'edit' icons, including, for example, a 'draw stroke' icon 1131, an 'open file' icon 1134, a 'save file' icon 1133, a 'go to previous/next frame' icon 1132, and an 'undo' icon 1135 in an animated message input menu.

Figure 12:
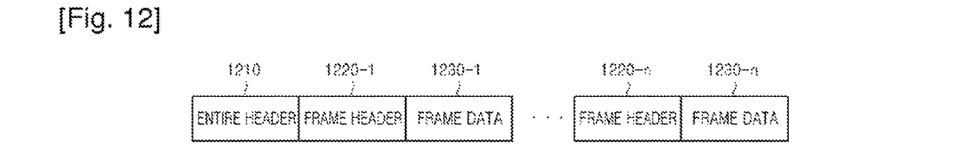
FIG. 12 is a diagram illustrating a data structure of input images, according to an embodiment of the present invention.

Upon completion of drawing a desired image in a frame, the user may save the frame by clicking the 'save file' icon 1133. To edit the next frame, the user may move to the next frame by clicking the 'go to previous/next frame' icon 1132 and draw an image. The user may draw a frame image by reading a stored frame by clicking the 'open file' icon 1134 and editing only a portion of the file to be corrected. FIG. 12 illustrates a data structure of input images, according to an embodiment of the present invention.

Referring to FIG. 12, the data structure of input images includes an entire header 1210 for storing the total amount of data and information about frames, frame headers 1220 (1220-1 to 1220-n) for storing the amount of data of each frame and information about each frame, and frame data fields 1230 (1230-1 to 1230-n) for storing input information (e.g., a stroke thickness, point coordinates, a color, and/or an input order) of each object in each frame. The number of frame headers 1220 and frame data fields 1230 equals the number of frames constructed in an animated message.

Figure 13:
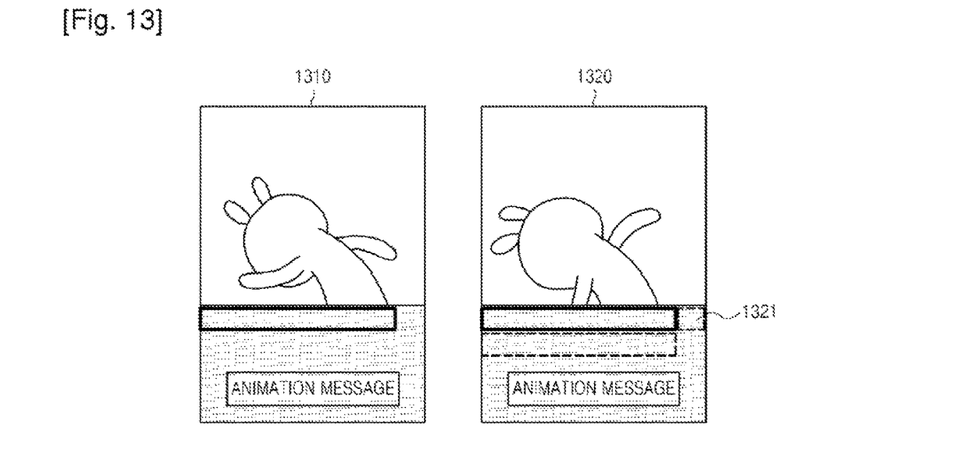
FIG. 13 is a diagram illustrating an animated message, according to an embodiment of the present invention.

FIG. 13 illustrates an animated message, according to an embodiment of the present invention.

Referring to FIG. 13, after object input information for a previous frame 1310 is encoded, if an additional frame 1320 is stored, its object information is encoded and stored in an encoding region 1321, succeeding the encoding region in the previous frame 1310. To reduce the amount of data of a frame presently being encoded, only a difference between the current frame and the previous frame may be extracted and stored. In a storage unit of storing data input by a user on a frame basis, the amount of data may be reduced by simplifying point data input by the user in a 240×80 encoding region at the bottom of an animated message, converting the simplified data in units of objects of strokes, and encoding the converted data.

If a device having received an animated message cannot decode the received animated message, an image of the last frame may be displayed in a handwriting region.

As is apparent from the foregoing description, in addition to delivering text information or delivering image information created by a sender, the present invention generates an animated message by setting time information and playback information of objects made by individualizing the information input by the sender to deliver the sender's emotion more vividly. A recipient having received the animated message may display the message information with various animation effects by analyzing the time information and the playback information of the individual objects in the animated message.

In addition, embodiments of the present invention may extract objects, such as characters, memorandums, and pictures, not only from a handwritten image input by a user, but also from an image captured using a camera unit. Embodiments of the present invention may also generate an animated message by adding time information to the extracted objects. In this case, objects deformed due to the camera photography may be automatically corrected during object extraction.

Moreover, the present invention may generate an animated message by creating and storing handwritten inputs on a frame basis, and may separately set an encoding region in addition to a handwriting region for displaying handwritten images, and encode user's handwritten input information (object information, a playback order of objects, etc.) of each frame in the encoding region before transmission. A recipient receives the animated message, analyzes information in the encoding region on a frame basis during decoding of the animated message, and sequentially displays the frames, ensuring dynamic animation effects. In this way, a dynamic video message like the existing Graphics Interchange Format (GIF) or Flash video may be realized using a single animated message.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for transmitting a message from an electronic device to another electronic device, comprising:
    receiving, by a processor of the electronic device, handwritten input comprising one or more input objects;
    determining, by the processor, a display order of the one or more input objects according to an input order of the one or more input objects using input times of the one or more input objects;
    generating a plurality of animation effects;
    associating each of the one or more input objects with a corresponding animation effect among the plurality of animation effects;
    generating, by the processor, playback information including a display order of the one or more input objects, each associated with a corresponding animation effect;
    generating, by the processor, an animation message including coding information of a plurality of frames composing the animation message, wherein the coding information includes the playback information and differences among two or more frames of the plurality of frames; and
    transmitting, by a communication interface of the electronic device, the animation message to the another electronic device.

2. The method of claim 1, further comprising:
    generating, by the processor, handwritten input information using the input coordinates of the one or more input objects and the input times of the one or more input objects.

3. The method of claim 2, wherein the handwritten input information comprises the input times of the one or more input objects, the input coordinates of the one or more input objects, input orders of one or more input handwriting strokes, attributes of the one or more input handwriting strokes, or input colors of the one or more input handwriting strokes.

4. The method of claim 2, wherein generating the handwritten input information comprises:
    creating, by the processor, a first image corresponding to the handwritten input inputted through a display of the electronic device;
    recognizing, by the processor, the one or more input objects from the first image; and
    determining, by the processor, the input times of the one or more objects and the input coordinates of the one or more input objects.

5. The method of claim 2, wherein generating the handwritten input information comprises:
    identifying, by the processor, color information of a central region of a first image captured by a camera unit of the electronic device;
    extracting, by the processor, edge information in a region having the color information of the central region;
    separating and extracting, by the processor, a central interested region based on the color information or the edge information;
    extracting, by the processor, contour information of the object in the central region by performing region growing on a region having a color similar to that of the central interested region;
    extracting, by the processor, an object from the central region using the contour information;
    detecting, by the processor, corners by extracting boundaries of the object;
    performing, by the processor, affine transform on the object;
    separating, by the processor, an input object from a background of the image by binarizing the image; and
    determining, by the processor, an input time of the input object.

6. The method of claim 1, wherein each of the one or more input objects comprises a handwriting stroke, a shape, an image, or a character.

7. The method of claim 1, wherein the playback information further comprises a region location indicating location information of each of the one or more input objects, a timeline number indicating a unique number of a reference time axis along which animation is played, a repetition indicator which is a flag indicating whether each of the one or more input objects are to be repeatedly displayed, a duration indicator indicating a unit of time, or a duration indicating a time for which each of the one or more input objects is displayed on a display of the another electronic device.

8. The method of claim 2, wherein further comprising:
    converting, by the processor, the handwritten input information into one or more code values;
    mapping, by the processor, the one or more code values to each of a plurality of blocks in the second region; and
    changing, by the processor, a level of a gray value of each of the plurality of blocks according to a bit value of a respective code value.

9. The method of claim 8, wherein the gray value is expressed in 4 levels capable of displaying 2-bit values, or in 8 levels capable of displaying 3-bit values.

10. An electronic device for transmitting a message to another electronic device, comprising:
    a processor configured to:
        if a handwritten input comprising one or more input objects is received, determine a display order of the one or more input objects according to an input order of the one or more input objects using input times of the one or more input objects;
        generate a plurality of animation effects;

associate each of the one or more input objects with a corresponding amination effect among the plurality of animation effects;

generate playback information including the display order of the one or more input objects, each associated with a corresponding animation effect; and generate an animation message including coding information of a plurality of frames composing the animation message, wherein the coding information includes the playback information and differences among two or more frames of the plurality of frames; and a communication interface configured to transmit the animation message to the another electronic device.

11. The electronic device of claim 10, wherein the processor is further configured to generate handwritten input information using input coordinates of the one or more input objects, and the input times of the one or more input objects.

12. The electronic device of claim 11, wherein the handwritten input information comprises the input times of the one or more input objects, the input coordinates of the one or more input objects, input orders of one or more input handwriting strokes, attributes of the one or more input handwriting strokes, or input colors of the one or more input handwriting strokes.

13. The electronic device of claim 11, wherein the processor is further configured to:

create a first image corresponding to the handwritten inputted through a display of the electronic device;

recognize the one or more input objects from the first image; and determine the input times of the one or more input objects and the input coordinates of the one or more input objects.

14. The electronic device of claim 11, wherein the processor is further configured to:

identify color information of a central region of a first image captured by a camera unit of the electronic device;

extract edge information in a region having the color information of the central region;

separate and extract a central interested region based on the color information and the edge information;

extracting contour information of the object in the central region by performing region growing on a region having a color similar to that of the central interested region;

extract an object from the central region using the contour information;

detect corners by extracting boundaries of the object;

perform affine transform on the object;

separating an input object from a background of the image by binarizing the image; and generate an input time of the input object.

15. The electronic device of claim 10, wherein each of the one or more input objects comprises a handwriting stroke, a shape, an image, or a character.

16. The electronic device of claim 10, wherein the playback information further comprises a region location indicating location information of each of the one or more input objects, a timeline number indicating a unique number of a reference time axis along which animation is played, a repetition indicator which is a flag indicating whether each of the one or more input objects are to be repeatedly displayed, a duration indicator indicating a unit of time, or a duration indicating a time for which each of the one or more input objects is displayed on a display of the another electronic device.

17. The electronic device of claim 10, wherein the processor is further configured to:

convert the handwritten input information into one or more code values;

map the one or more code values to each of a plurality of blocks in the second region; and change a level of a gray value of each of the plurality of blocks according to a bit value of a respective code value.

18. The electronic device of claim 17, wherein the gray value is expressed in 4 levels capable of displaying 2-bit values, or in 8 levels capable of displaying 3-bit values.

* * * * *